UNITED STATES PATENT OFFICE.

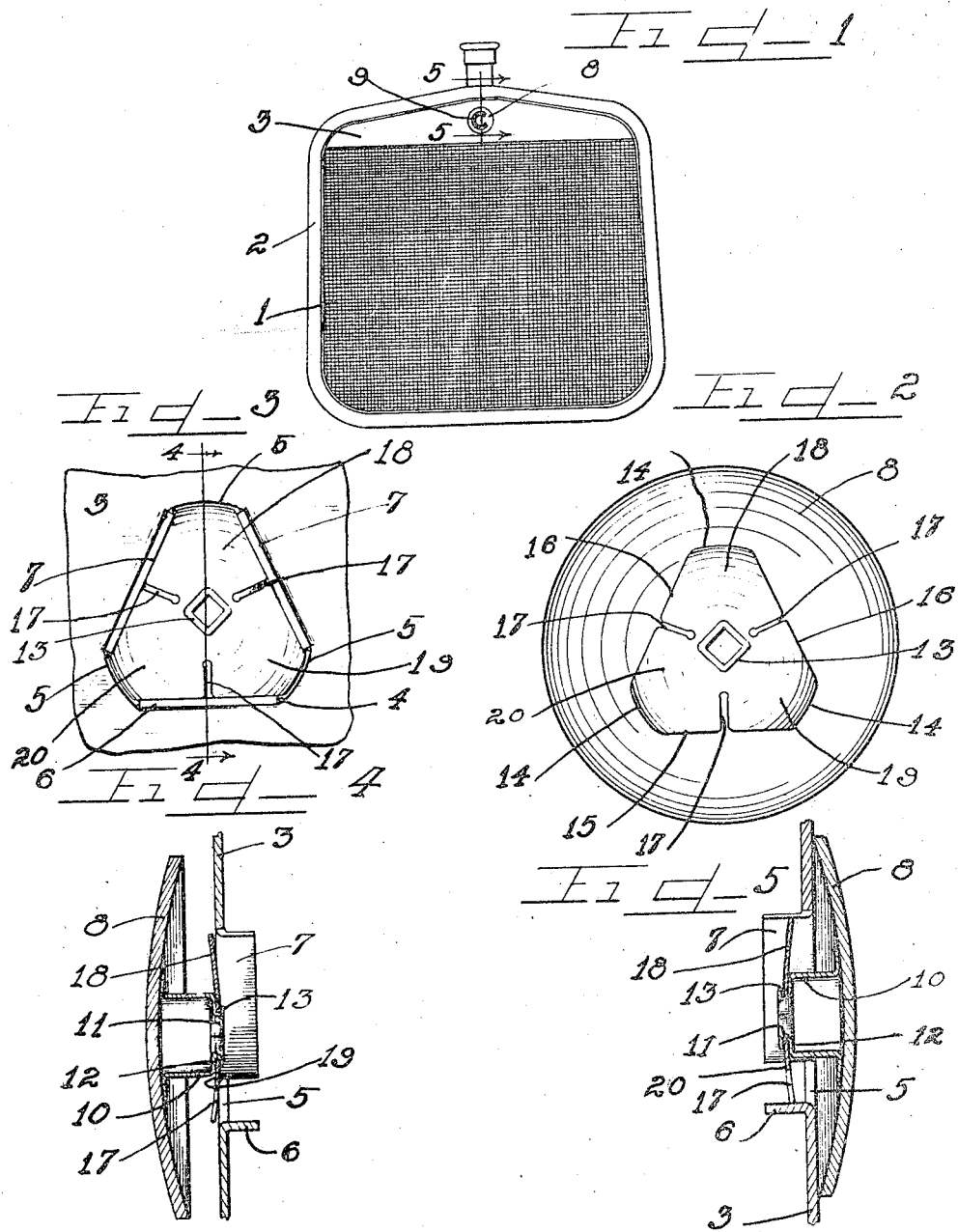

HENRY J. DUCKGEISCHEL, OF CHICAGO, ILLINOIS, ASSIGNOR TO S. D. CHILDS & COMPANY, A CORPORATION OF ILLINOIS.

VEHICLE NAME-PLATE.

1,250,151.  Specification of Letters Patent.  Patented Dec. 18, 1917.

Application filed April 9, 1917. Serial No. 160,687.

*To all whom it may concern:*

Be it known that I, HENRY J. DUCKGEISCHEL, a citizen of the United States, and a resident of the city of Chicago, in the county of Cook and State of Illinois, have invented certain new and useful Improvements in Vehicle Name-Plates; and I do hereby declare that the following is a full, clear, and exact description of the same, reference being had to the accompanying drawings, and to the numerals of reference marked thereon, which form a part of this specification.

This invention covers an improved form of a vehicle name plate provided with resilient means adapted to be frictionally sprung between suitable inwardly directed flanges integrally formed, on the inner upper central portion of the radiator shell of the vehicle, by bending back portions of the margin of an opening formed in said radiator shell for receiving the resilient means of the name plate.

It is an object of this invention to construct a vehicle name plate provided with resilient members adapted to be inserted through a suitable opening in the vehicle to frictionally engage inturned portions of the margin of said opening to hold the name plate in position.

It is also an object of this invention to provide a name plate having a resilient slotted member rigidly secured on the rear thereof to frictionally engage between suitable lugs struck rearwardly from the radiator shell of an automobile thereby providing an opening for receiving said slotted member to permit said frictional engagement.

It is furthermore an object of this invention to construct a name plate wherein a slotted triangular means is rigidly secured upon the rear of the name plate, to engage in one position only through a triangular opening in the radiator shell of a vehicle and frictionally engage between triangularly disposed lugs integrally formed on the interior of the radiator shell for rigidly holding the name plate in position.

It is an important object of this invention to provide a radiator name plate simple in construction adapted to be rigidly sprung into position, in an apertured radiator shell, in one position only.

Other and further important objects of the invention will be apparent from the disclosures in the drawings and specification.

The invention (in a preferred form) is illustrated in the drawings, and hereinafter more fully described.

On the drawings:

Figure 1 is a front plan view of an automobile radiator and radiator shell, having a name plate secured thereon embodying the principles of my invention.

Fig. 2 is a rear view of the name plate.

Fig. 3 is an enlarged fragmentary rear view of the apertured portion of the radiator shell showing the name plate in position.

Fig. 4 is a section taken on line 4—4, of Fig. 3, showing the name plate in position to be pressed into place.

Fig. 5 is an enlarged section taken on line 5—5, of Fig. 1, showing the name plate secured in position.

As shown on the drawings:

Since motor driven vehicles usually have their name plates secured upon the front end thereof, Fig. 1, has been designed to show an automobile radiator 1, surrounded by a radiator shell 2, having integrally formed or rigidly secured transversely across the upper portion thereof, above the radiator, a radiator shell plate 3. Cut or stamped centrally from the plate 3, is an isosceles triangular opening or aperture 4, the corners of which are rounded as denoted by the numeral 5, said opening 4, having its shorter side or base disposed horizontally with the apex angle thereof divided equally by a vertical center line through the shell plate 3. Integrally formed at the base and sides of the opening 4, between the curved portions 5, thereof, is a rearwardly directed base flange or lug 6, and two rearwardly directed side flanges or lugs 7, of equal length, but longer than the base flange 6. The respective flanges 6 and 7, are disposed at an angle with respect to one another, as clearly shown in Fig. 3, and are formed by cutting away portions of the plate 3, thus forming the opening 4, and bending back the remaining portions at right angles to the inner face of the shell plate.

The reference numeral 8, designates the name plate proper, which is convex and of any desired shape, and made of metal or other suitable materials, having a letter, monogram, or emblem 9, brazed, soldered or enameled on the front or convex surface thereof. Brazed or soldered centrally on the rear or concave surface of the name plate 8, is a rearwardly directed collar or stub 10, the outer end 11, of which is of reduced size forming a shoulder 12, and projects through a suitable centrally disposed aperture in a retaining or attaching plate slightly smaller than the opening 4, which seats upon said shoulder 12, and is rigidly secured in position thereon at right angles thereto by expanding or swaging the reduced end 11, of said collar, as denoted by the reference numeral 13, or by any other suitable means desired. The retaining or attaching plate is formed in the shape of an isosceles triangle, the corners of which are rounded as denoted by the numerals 14, and having the shorter edge or side 15, thereof, disposed in a position below the center of the name plate 8, and at right angles to a vertical center line taken through the design upon the convex surface of the name plate. The longer and equal edges or sides 16, of the retaining plate, and the shorter side 15, are each provided with a notch or slot 17, disposed at right angles to the respective sides of the retaining plate, thus dividing the same into flexible or resilient tongues or spring plates 18, 19 and 20, the tongues 19 and 20, being of equal size and slightly larger than the tongue 18, thereby producing a retaining or mounting plate for the name plate, adapted to be engaged in the radiator shell plate opening 4, between the flanges 6 and 7, in one position only, that being the position in which the center lines of the emblem 9, are in a vertical and horizontal position when the name plate is secured upon the shell plate 3, of the automobile.

The operation is as follows:

The mounting of the name plate 8, upon the radiator shell plate 3, or in any other suitable place upon an automobile or other vehicle, is very simple, since the mounting opening 4, and the retaining plate are each shaped in the form of an isosceles triangle, with the corners thereof, rounded, thus permitting the retaining plate to engage in the opening 4, in one position only, with the shorter retaining plate edge 15, engaging the flange 6, and with the retaining plate edges 16, engaging the side flanges 7, in which position the tongue 18, is disposed above the tongues 19 and 20, and is engaged between the upper ends of the flanges 7, while the larger tongues 19 and 20, each contact the flange 6, and the lower end of one of said flanges 7, as clearly shown in Fig. 3. With the name plate positioned as described and as shown in its initial mounting position in Fig. 4, pressure is applied upon the convex surface of the name plate, thereby frictionally forcing the tongues 18, 19 and 20, between the respective flanges 6 and 7. The flanges are stronger than the flexible tongues and therefore resist spreading apart, thereby bending said tongues toward the name plate, as shown in Fig. 5, and rigidly holding the name plate in mounted position upon the front of the shell plate 3, with the outer rim of said name plate bearing tightly against the outer surface of the radiator shell plate. In this position the emblem 9, of the name plate is properly disposed on the front of the automobile with its center lines in a vertical and horizontal position. With the name plate mounted as shown in Fig. 5, it will be seen that the name plate cannot be removed except by exerting a considerable amount of force sufficient to overcome the outwardly flexed tongues 18, 19 and 20, which tend to clamp or lock against the flanges 6 and 7, to resist any outward movement of the name plate.

I am aware that various details of construction may be varied through a wide range without departing from the principles of this invention, and I therefore do not purpose limiting the patent granted otherwise than necessitated by the prior art.

I claim as my invention:

1. The combination with a plate having a triangular opening therein, of a name plate, and a slotted triangular plate thereon adapted to engage in said opening to rigidly hold the name plate in position upon said first mentioned plate.

2. In a device of the class described the combination with an apertured automobile radiator shell, of a name plate, and slotted triangular retaining means thereon adapted to engage in said aperture to rigidly hold said plate in mounted position on said radiator shell in one position only.

3. In a device of the class described the combination with an automobile radiator shell having a triangular opening therein, means struck inwardly therefrom, a name plate, and a resilient triangular plate thereon adapted to project through said triangular opening and frictionally engage said means to hold the name plate locked in position upon said radiator shell.

4. In a device of the class described the combination with a vehicle plate having a triangular opening therein, one side of which is shorter than the others, a flange struck inwardly from each side of said opening, a name plate, and triangular retaining means rigidly secured thereto having one side shorter than the others to permit the retaining means to project through said opening in one position only with the shorter side thereof registering with the shorter side of said opening and with the retaining means engaging said flanges to frictionally hold the name plate in position upon said vehicle plate.

5. The combination with means having an opening therein in the shape of an isosceles triangle, of a name plate, and means secured thereto having the shape of an isosceles triangle adapted to engage in said opening in one position only to hold said name plate locked in position upon said first mentioned means.

6. In a device of the class described, a plate having an aperture therein, integral means struck rearwardly from the margin of said aperture, a name plate, and slotted means rigidly secured thereon adapted to project through said aperture in one position only to frictionally engage said integral means to hold said name plate locked in position upon said plate.

7. In a device of the class described, a plate, means integrally formed thereon, a name plate, and a resilient slotted plate thereon adapted to frictionally engage said means to hold said name plate in position on said first mentioned plate and lockingly resist the removal thereof.

8. The combination with a mounting plate, of means integrally formed thereon, a name plate, a stud rigidly secured axially thereon, and a resilient slotted plate secured on said stud at right angles thereto adapted to frictionally engage said means to lockingly hold the name plate associated with said mounting plate.

In testimony whereof I have hereunto subscribed my name in the presence of two subscribing witnesses.

HENRY J. DUCKGEISCHEL.

Witnesses:
CHARLES W. HILLS, Jr.,
EARL M HARDINE.